United States Patent
Gulleson

[11] 3,762,370
[45] Oct. 2, 1973

[54] MILKING PARLOR

[76] Inventor: Grant L. Gulleson, Rutland, N. Dak. 58067

[22] Filed: June 8, 1972

[21] Appl. No.: 260,995

[52] U.S. Cl. .......................................... 119/14.03
[51] Int. Cl. ............................................ A01j 5/00
[58] Field of Search ..................... 119/14.03, 14.04, 119/52 R

[56] References Cited
UNITED STATES PATENTS

| | | | |
|---|---|---|---|
| 3,116,713 | 1/1964 | Darling | 119/14.04 |
| 2,316,065 | 4/1943 | Hapgood | 119/14.04 |
| 3,460,515 | 8/1969 | Page et al. | 119/14.03 X |

FOREIGN PATENTS OR APPLICATIONS

| 803,492 | 10/1958 | Greece | 119/14.03 |
|---|---|---|---|

Primary Examiner—Robert Peshock
Assistant Examiner—J. N. Eskovitz
Attorney—Ralph F. Merchant et al.

[57] ABSTRACT

A milking system is disclosed having a stationary circular base upon which cows being milked and fed are guided around by a circular framework having a center of rotation about a pipe located at the center of the framework. The pipe serves the purpose of guiding the framework in a horizontal direction, and roller bearings are provided near the periphery of the framework for supporting the framework. The framework is rotated by a chain which is wrapped around the framework and driven by an electric motor.

11 Claims, 5 Drawing Figures

3,762,370

MILKING PARLOR

BACKGROUND OF THE INVENTION

1. Field of the Invention

This invention relates to a milking system and more particularly to a milking system having a rotating framework of stalls adapted to handle a plurality of cows.

2. Description of the Prior Art

Until recently the milking of cows has been accomplished by hand. In the last few decades there has been introduced milking machines for both ease of milking and for reducing the amount of labor required. To further reduce the labor requirement for the milking of cows there have also been introduced various milking parlors. These milking parlors take on various means of positioning the cows and of moving the cows through the parlor. Generally the cows are placed upon a movable platform and rotated through the milking parlor. For examples of prior art describing movable platforms reference should be had to U.S. Pat. No. 3,095,854, issued to E. H. Bott et al. and U.S. Pat. No. 3,103,912, issued to A. P. Benedetto.

However, it is not necessary to support and rotate the cows since the cows can be made to walk through a milking parlor simply by gently nudging the cow forward. Accordingly, an improvement over the movable platform is described in U.S. Pat. No. 3,116,713, issued to N. E. Darling. Darling discloses a milking system wherein the cows are moved through the milking parlor by a framework having a center pipe for supporting the framework which pipe is rotatable by means of a drive mechanism acting upon the pipe.

I have found that this type of a system has various drawbacks. Since the pipe supports the entire framework costly bearings are required in order to support the pipe and for correct alignment of the pipe. Additionally, the milking lines leading from the milkhouse, through the pipe, into the pit area must be provided with slip ring assemblies since the pipe is constantly rotating. Also, since the power is applied to the relatively small diameter pipe the motor must be capable of providing a high force since very little torque is developed through this small radius.

SUMMARY OF THE INVENTION

In accordance with the invention a milking system is provided having a stationary base for supporting cows which are to be milked, and having a frame structure with a center of rotation and a plurality of milking stations located at the periphery thereof, the frame structure being horizontally guided for movement about the center of rotation and being vertically supported near the periphery thereof, the frame being rotatable by an electric motor for moving cows through the milking system.

Accordingly, it is an object of the present invention to provide a milking system having a stationary cow supporting base, wherein the milking system framework which is used for moving the cows through the milking system is supported near the periphery of the framework.

It is a further object of the present invention to provide a milking system wherein the center pipe about which the framework rotates merely guides the framework in a horizontal direction and does not provide a vertical support function.

It is a further object of the present invention to provide a milking system having a center pipe which does not rotate so as to enable the transportation of the various milking hoses through the pipe without the requirement of a slip ring assembly.

It is a further object of the present invention to provide an economical low-cost milking system not requiring expensive support bearings.

It is a further object to provide a milking system where the power to rotate the milking system framework is applied at the periphery of the framework.

It is a still further object of the present invention to provide a milking system having feed means located radially outward from the milking station so that the cow to be milked will turn his head and consequently require less space for each milking station.

It is a further object of the present invention to provide feed means for the cows such that feed is not dropped upon the cow supporting platform creating feed dust and causing feed waste.

BRIEF DESCRIPTION OF THE DRAWINGS

Other objects and advantages of the invention will become apparent upon reading detailed description and upon reference to the drawings, in which.

DETAILED DESCRIPTION OF THE DRAWINGS

Figure 1:
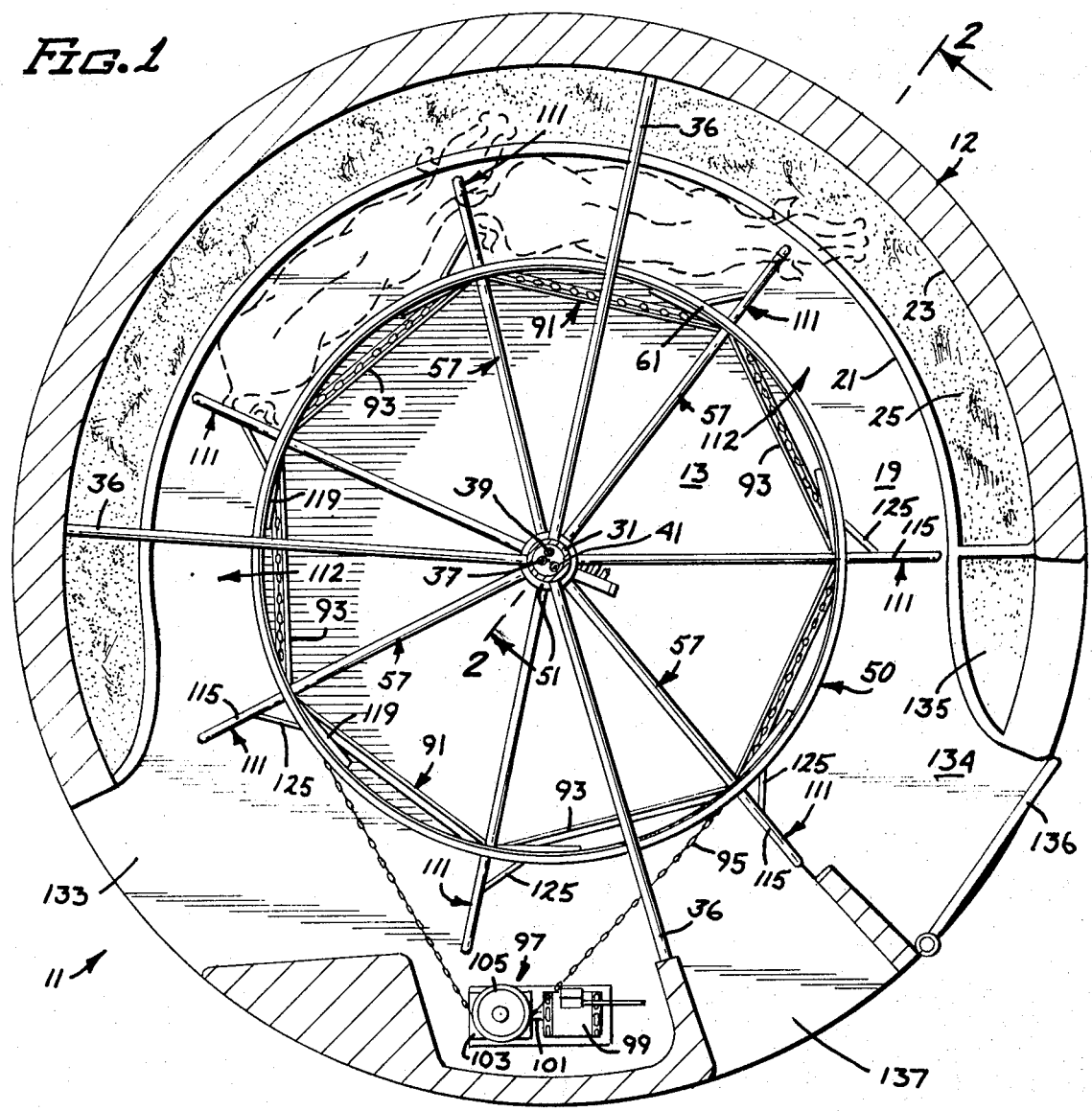
FIG. 1 is a view in top plan of the milking system of the present invention.
Figure 2:
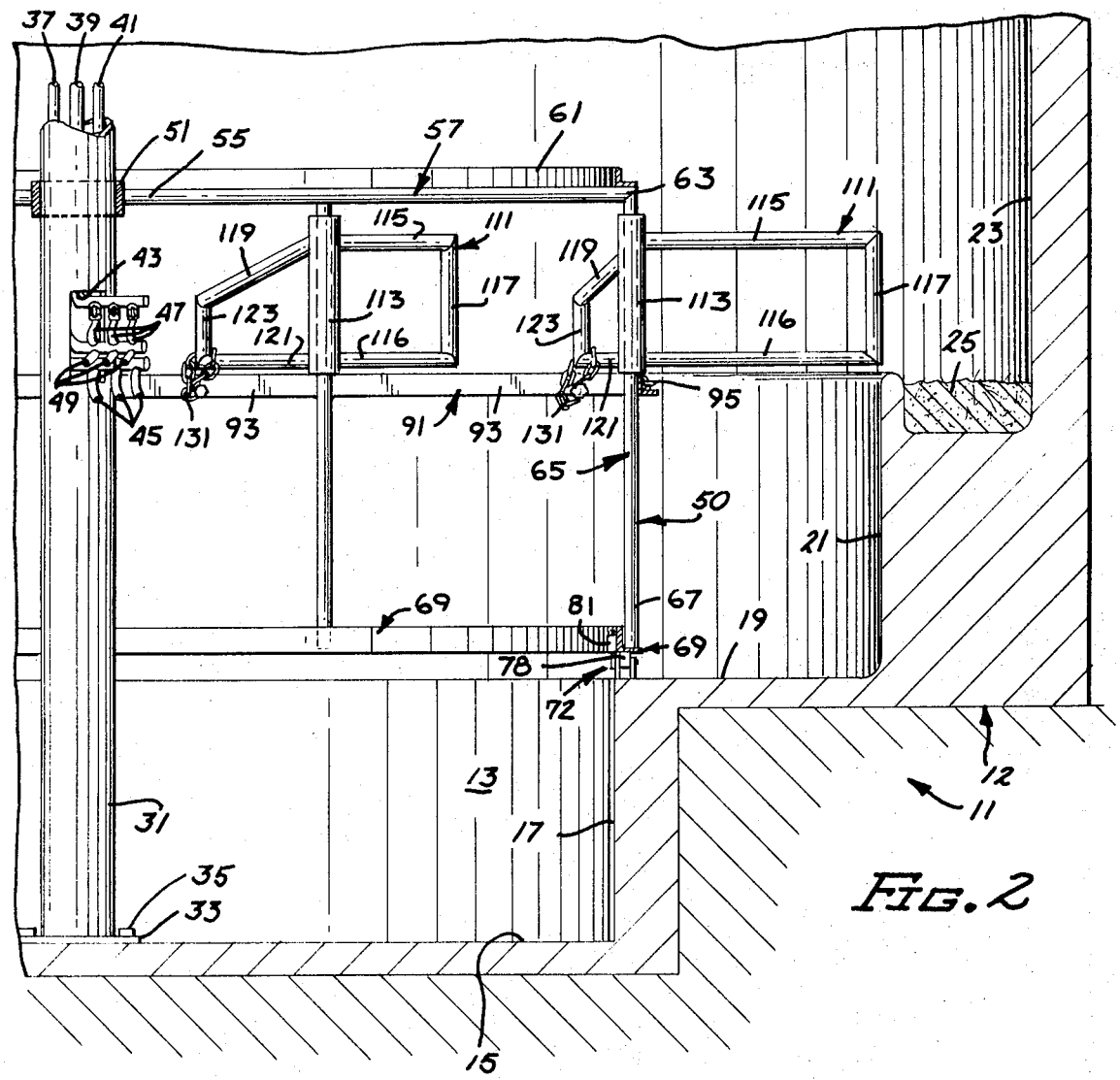
FIG. 2 is a view along line 2—2 of FIG. 1.

Referring first to FIGS. 1 and 2 of the drawings the milking system, generally designated 11, of the present invention is shown constructed within an enclosure generally designated 12. Enclosure 12 has a pit area 13 having a horizontally circular pit floor 15 and an upwardly extending peripheral wall 17. Above the pit area 13 is a circular platform 19 in horizontally parallel spaced relationship to the pit floor 15. Platform 19 is contiguous with an upwardly extending peripheral wall 21. An upwardly extending peripheral wall 23 is in spaced parallel relationship to wall 21 and it comprises the outside wall of the milking area. A horizontally disposed food trough 25 is formed between walls 21 and 23.

A hollow vertical extending pipe 31 is located central to the milking system 11 and the enclosure 12. Pipe 31 has a flange 33 on the bottom thereof for the insertion of bolts 35 to fixedly secure pipe 31 to floor 15. Pipe 31 may, of course, be secured to floor 15 by any other well known means. The pipe 31 is held at the top thereof by three radially extending arms 36 which are secured at their outside ends to the enclosure 12.

Pipe 31 has a hollow interior through which a wash line 37, a milk line 39, and a vacuum line 41 can be transported from their origin at the milkhouse, through pipe 31, and then out a hole 43 located in the wall of the pipe 31. Three vacuum hoses 47 are shown leading off of the vacuum line 41 into the milk line 39, and three milk hoses 49 lead off of the milk line. Three wash hoses 45 are shown leading off of the wash line 37 for washing out the milk hoses 49 subsequent to their use. It should be appreciated that, depending upon the number of cows it is desired to milk, a various number of hoses could be used.

Figures 3, 4:
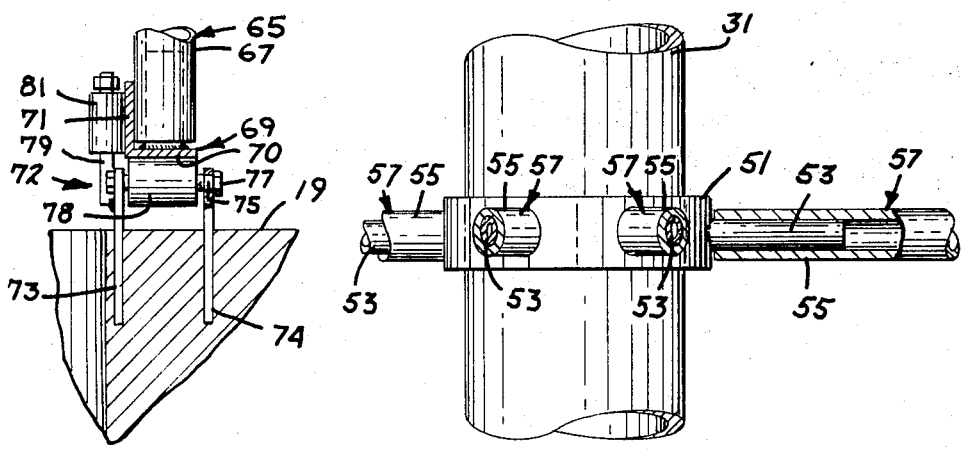
FIG. 3 is an enlarged detailed view of the support structure of the framework of the present invention.
FIG. 4 is an enlarged detail of a portion of the milking system framework of the present invention.

Referring now additionally to FIG. 4 in conjunction with FIGS. 1 and 2 the framework 50 for the milking system 11 will be discussed. In FIG. 4 there is shown a collar 51 which circumscribes the pipe 31. The collar 51 is not fixedly attached to pipe 31 and is free to rotate with respect to the pipe 31 and also to move longitudinally along the pipe 31. The collar 51 is shown to have seven radially outwardly directed pipes 53 which are attached to collar 51 as by welding. Each of the pipes 53 are insertable within a sleeve end portion 55 of radially outwardly extending arms 57. The pipes may be secured within the sleeve portion 55 by welding or bolting.

Referring in particular to FIG. 2, an L-shaped angle iron 61 is bent in a continuous circular shape and is attached to the top surface, as by welding, of each of the arms 57 near the outside ends 63 of the arms 57. Attached at each end 63 of each outwardly directed arm 57 is a downwardly directed support arm 65. At the bottom end 67 of each of the downwardly directed arms 65 an attachment is made, for example by welding, to an L-shaped angle iron 69 which is bent in a continuous circle substantially in parallel relationship with the angle iron 61. The angle iron 69 has a horizontally outwardly extending side 70 and a vertically upwardly extending side 71. If desired side 70 may have upwardly directed pipes such as pipes 53 for insertion within a sleeve located within the bottom end of arm 65 as shown in FIG. 3. It should be appreciated that angle irons 61 and 69 could be constructed from other than angle irons such as from square tubing.

Referring now additionally to FIG. 3 there is shown in detail the support structure 72 which supports the milking system framework 50. The support structure 72 includes a pair of radially spaced iron straps 73 and 74 which are set in the platform 19 near the inside periphery thereof in at least three positions around the circular platform 19. The straps 73 and 74 each have a horizontally extending hole 75 therethrough for insertion of a bolt 77 about which a roller bearing 78 is free to rotate. The roller bearing 78 provides a vertical force for supporting the side 70 of the angle iron 69 and thus for allowing rotation of the angle iron 69 about pipe 31. It should be appreciated that, while the roller bearing 78 provides the vertical component to support the frame structure 50 of the milking system, the collar 51 of the frame structure 50 cooperates with the pipe 31 in order to retain the frame 50 in horizontal alignment. In order to aid in the horizontal alignment of the frame 50 the radially inside strap 73 has attached to it an upwardly directed stud 79 with a roller bearing 81 thereon for cooperation with the vertical side 71 of the angle iron 69 to provide a horizontal force. It should be appreciated that the roller bearings could be used as the exclusive apparatus for horizontally aligning the framework 50.

Referring in particular to FIGS. 1 and 2, a continuous L-shaped angle iron 91 is shown having straight portions 93 extending between adjacent downwardly directed support arms 65 and attached to each support arm 65, as by welding, approximately at the midsection of the length of each support arm 65. Angle iron 91 is located in a horizontal plane substantially parallel with angle irons 61 and 69.

Referring again to FIG. 1 there is shown a log-type chain 95 circumscribing substantially all of the angle iron 91 and in frictional contact therewith, and the apparatus 97 which is used to move the log chain 95 causing movement of the angle iron 91 and consequently the framework 50. The driving apparatus 97 has a one-quarter horsepower electrically driven motor 99 having an output shaft 101 whose rotational speed is varied by a gear box 103 for driving a sprocket 105. Sprocket 105 is a chain hoist sprocket providing frictional engagement to chain 95 for the movement thereof.

Referring to FIGS. 1 and 2 there is shown the frames 111 which are used to provide milking stations 112. It should be appreciated that an individual milking station 112 is defined by the area between a pair of frames 111. Frame 111 includes a vertically extending hollow pipe 113 through which the downwardly extending arm 65 is inserted prior to finally welding the frame 50. It can be seen by reference to FIG. 2 that the pipe 113 is supported at the bottom thereof by the angle iron 91. Extending radially outwardly from pipe 113 are a pair of horizontally spaced apart bars 115 and 116. A bar 117 connects the bars 115 and 116 near the outside ends thereof in parallel spaced relationship to the pipe 113. Attached to pipe 113 and extending radially outwardly at approximately ninety degrees from pipes 115 are pipes 119 and 121. Pipe 121 is generally horizontally extending whereas pipe 119 is downwardly and radially outwardly extending from the pipe 113. Attaching pipes 119 and 121 near their outside ends is pipe 123 which is disposed approximately parallel with respect to pipe 113. Braces 125 connect the bars 115 with the bars 119 and the bars 116 with the bars 121.

Figure 5:
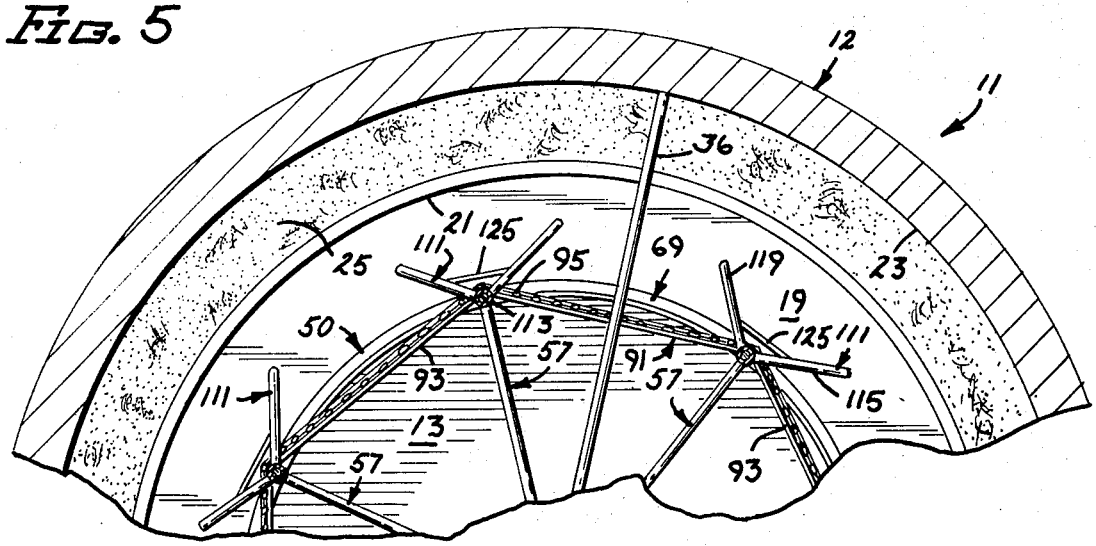
FIG. 5 is a partial view of the milking system framework of the present invention.

The frames 111 are rotatable about downwardly extending arm 65 so as to be used in a first position as shown in FIG. 1 to provide stalls for the cows, and in a second position as shown in FIG. 5 so that the platform 119 may be more open allowing for cleaning. In order to retain the framework 111 in its position for milking a chain 131 is removably attachable to frame 91 and can be wrapped around the arm 121 of framework 111.

Referring now to FIG. 1, in operation, a cow to be milked is led into entrance area 133 and as the frame 50 rotates in a clockwise direction the cow will assume a position as shown in dotted line within a milking station 112. By providing the feed trough 25 in a position radially outward of the milking stations the cow will be forced to turn his head so as to eat from the trough 25. This provides an advantage in requiring less area for each milking station allowing more cows to be milked, and, additionally, there is not feed dust on platform 19 since there is no dropping of feed onto the platform. Additionally, there is not a feed waste as any feed that is dropped will be dropped back into the trough as opposed to on the platform 19. At the exit 134 a dribble trough 135 is provided to catch any food which falls from the cow. After the cow has finished she swings gate 136 and leaves the enclosure 12.

In the milking operation, after the cow is brought through the entrance 133 into a milking station 112 an operator located within the pit 13 will wash the cow's udder and attach the milking apparatus to the cow. In order for the operator to gain entrance to the pit 13 a walkway 137 is provided which can have a floor which is sloping downwardly inwardly so that the operator can walk beneath the frame member 69. It can be seen by reference to FIG. 1 that in operation there are only five milking stalls that are available for use due to the space required for the entrance 133, the exit 134, and the apparatus 97 which is used to drive the milking system frame 50. For a five stall milking system a single operator can be used to operate the three milking units which are taken off of the three milk hoses 49. The milking unit will be on each cow for about 6 minutes as the cows are forced by the frame 50 to walk around the platform 19 at the rate of about four feet per minute. By the time that the cow has reached the exit 134 the cow has completed its milking and the operator will detach the milking apparatus from the cow and walk the apparatus over to the entrance area 133 for the insertion of the apparatus onto a new cow.

Thus it is apparent that there has been provided, in accordance with the invention, a milking system that fully satisfies the objects and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, an variations as fall within the spirit and broad scope of the appended claims.

I claim:

1. A milking system, comprising:
   a. a stationary base for supporting a cow to be milked;
   b. a frame structure having a center of rotation, a periphery, and a plurality of milking stations;
   c. means horizontally guiding said frame for movement about said center of rotation;
   d. means located between said frame near said periphery and said base for supporting said frame and allowing movement of said frame with respect to said base; and
   e. means for rotating said frame.

2. The milking system of claim 1 including a food trough located radially outwardly of said milking stations around a substantial portion of said frame structure.

3. The milking system of claim 1 wherein said periphery of said frame structure is generally annular.

4. The milking system of claim 3 wherein said means horizontally guiding said frame includes:
   a. a vertically extending post;
   b. means fixedly attaching said post to said base;
   c. a collar located around said pipe for rotation about said pipe and movable along said pipe; and
   d. a plurality of arms, each attached at one end to said collar and extending radially outwardly and attached near the other end to said periphery of said frame.

5. The milking system of claim 4 wherein said vertically extending post comprises a pipe defining a hollow interior and a hole through the wall of said pipe, and further including milking apparatus extending through said hollow pipe and said hole.

6. The milking system of claim 4 including a food trough located radially outwardly of said milking stations around a substantial portion of said frame structure.

7. The milking system of claim 4 wherein said frame structure includes:
   a. a first annular frame, said frame being attached to said plurality of arms;
   b. a second annular frame; and
   c. means attaching said second annular frame to said first annular frame in downwardly spaced parallel relationship,
   d. whereby said means for supporting said frame and allowing movement of said frame with respect to said base is in contact with said second annular frame.

8. The milking system of claim 6 including:
   a. a horizontally disposed continuous frame structure connecting each adjacent downwardly directed arm;
   b. a continuous flexible linkage in frictional contact with said continuous frame; and
   c. motor means moving said linkage for rotating said continuous frame about said pipe, whereby rotation of said continuous frame results in rotation of said milking stations about said pipe.

9. The milking system of claim 7 wherein said means for supporting said frame and allowing movement of said frame with respect to said base includes rollers attached to said base.

10. A milking system, comprising:
    a. a stationary base for supporting a cow to be milked;
    b. a vertically extending pipe defining a hollow interior and a hole through the wall of said pipe;
    c. means fixedly attaching said pipe to said base;
    d. a collar located around said pipe for rotation about said pipe and movement along said pipe;
    e. a plurality of arms;
    f. means attaching a first end of each of said arms to said collar in outwardly radially extending relationship with respect to said pipe;
    g. milking apparatus extending through said hollow pipe and said hole;
    h. a first annular frame member;
    i. means attaching said first frame member to each of said arms near a second end of said arms for rotation of said frame member about said pipe;
    j. a plurality of downwardly directed arms attached at a first end near said second ends of each of said radially extending arms;
    k. a plurality of frames;
    l. means attaching each of said frames to said downwardly directed arms in radially outwardly extending relationship to said pipe for providing stalls defined between each of said frames;
    m. a second annular frame;
    n. means attaching said second annular frame to a second end of each of said downwardly directed end in substantially parallel relationship with said first annular frame;
    o. roller means attached to said base for supporting said second annular frame and allowing movement of said second annular frame with respect to said base;
    p. a horizontally disposed continuous frame structure connecting each adjacent downwardly directed arm;
    q. a continuous flexible linkage in frictional contact with said continuous frame; and
    r. motor means moving said linkage for rotating said continuous frame about said pipe, whereby rotation of said continuous frame results in rotation of said stalls about said pipe.

11. The milking system of claim 10 wherein each of said frames include:
   a. a collar around a respective one of each of said downwardly directed arms and rotatable with respect thereto;
   b. at least one pipe extending radially outwardly from said collar; and
   c. locking means for fixing said pipe in a predetermined position with respect to said collar.

* * * * *